US006761314B2

(12) United States Patent
Schuessler

(10) Patent No.: US 6,761,314 B2
(45) Date of Patent: Jul. 13, 2004

(54) BAR CODE SYMBOLOGY FOR CONSUMER SCANNING APPLICATIONS

(75) Inventor: Frederick Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 106 days.

(21) Appl. No.: 09/953,782

(22) Filed: Sep. 17, 2001

(65) Prior Publication Data

US 2002/0056759 A1 May 16, 2002

Related U.S. Application Data

(60) Provisional application No. 60/237,639, filed on Oct. 3, 2000.

(51) Int. Cl.[7] ................................................. G11B 5/09
(52) U.S. Cl. ................................................. 235/462.19
(58) Field of Search ....................... 235/462.01, 462.08, 235/462.16, 462.18, 462.19, 494

(56) References Cited

U.S. PATENT DOCUMENTS

| 4,282,426 | A | * | 8/1981 | Neseem et al. | ......... 235/462.07 |
|---|---|---|---|---|---|
| 4,354,101 | A | * | 10/1982 | Hester et al. | .......... 235/462.07 |
| 4,450,349 | A | * | 5/1984 | Apitz et al. | ............ 235/462.18 |
| 5,262,625 | A | * | 11/1993 | Tom et al. | ............. 235/462.07 |
| 5,319,181 | A | * | 6/1994 | Shellhammer et al. | . 235/462.09 |
| 5,352,878 | A | * | 10/1994 | Smith et al. | ........... 235/462.16 |
| 5,479,515 | A | * | 12/1995 | Longacre, Jr. | ............... 380/54 |

* cited by examiner

Primary Examiner—Diane I. Lee
(74) Attorney, Agent, or Firm—Kirschstein, et al.

(57) ABSTRACT

A bar code symbology derived from form a set of patterns of bar and spaces in which each character spans a distance of m module widths and is represented by n bars and p interleaved spaces; and the largest single bar or space is limited to k modules in width, having a predetermined start pattern; a predetermined stop pattern; and providing the exclusion from the set of valid patterns those patterns such that the predetermined start pattern is only at one end of a valid symbol, and the predetermined stop pattern is only at the other end of a valid symbol.

6 Claims, 3 Drawing Sheets

BAR CODE SYMBOLOGY FOR CONSUMER SCANNING APPLICATIONS

REFERENCE TO RELATED APPLICATIONS

This application claims the benefit of provisional application Serial No. 60/237,639 filed Oct. 3, 2000.

COPYRIGHT NOTIFICATION

A portion of this patent document contains material which is subject to copyright protection. The copyright owner has no objection to the facsimile reproduction by any one of the patent disclosure, as it appears the Patent and Trademark Office, patent files or records, but otherwise reserves all copyright whatsoever.

BACKGROUND OF THE INVENTION

1. Field of the Invention

The invention relates to bar code reading and in particular to a new symbol with structure and features that make it particularly suitable for consumer-scanning applications. Its features include a compact start pattern that can be found without compute-intensive ratio checks, and an overall structure that supports variable-length messages while providing strong protection against short reads.

2. Background of the Invention

Bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies are in widespread use including UPC/EAN, Code 39, Code 128, Codeabar, and Interleaved 2 of 5.

In order to increase the amount of data that can be represented or stored on a given amount of surface area, several more compact bar code symbologies have been developed. One of these code standards, Code 49, exemplifies a "two dimensional" symbol by reducing the vertical height of a one-dimensional symbol, and then stacking distinct rows of such one dimensional symbols, so that information is encoded both vertically as well as horizontally. That is, in Code 49, there are several rows of bar and space patterns, instead of only one row as in a "one dimensional" symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but a matrix array made up of hexagonal, square, polygonal and/or other geometric shapes, lines, or dots. Such symbols are described in, for example, U.S. Pat. Nos. 5,2276,315 and 4,794,239. Such matrix code symbologies may include Vericode, Datacode, and MAXICODE.

Ever since the advent of the Universal Product Code in the 1970's, linear bar code symbols have been widely adopted as an inexpensive but effective way of automating the link between printed numbers on paper and computer databases. Each "symbology" has its own advantages for certain applications. Because bar codes are so common in our daily environment, and used in so many different applications, it is often important that a symbology, or a distinct variant of a symbology, be dedicated to one specific application. For example, a bar code scanning system may read a barcode encoding a string of digits such as "12345678905". It is very important that the system can unequivocally determine that this string is to be used to look up the price of a grocery item, and that the price can be found, using the decoded string of digits as a key, in a database of numbers assigned by the Uniform Code Council for this purpose. In the past many other symbologies and symbology variants have also been reserved for such specific uses, such as a Code 128 symbol for marking medical instruments, a 14-digit Interleaved Two-of-Five symbol for marking cases for logistics tracking, and a 6-digit Code 39 symbol for marking Telecommunications equipment.

One aspect held in common by all of the above traditional barcode applications, is that a worker (such as a checkout clerk at a supermarket) will be trained and paid to scan the specific kind of barcode required by the application. Recently, however, as the cost of computers, and of scanning hardware, has decreased, a new set of consumer-scanning applications have become feasible.

Consumer-scanning applications will in principle have many requirements in common with traditional bar code applications, except that the consumer-scanning application will increase the difficulty of meeting some of these requirements. In addition, consumer scanning places at least one new requirement on the symbology. The following paragraphs discuss the new requirements, and then the other requirements that differ in degree.

By definition, the consumer scanning system will be used by untrained and unpaid operators. An unpaid operator will simple abandon consumer scanning if it is perceived as difficult or unreliable. An untrained operator will put the scanning system at a disadvantage through poor technique (such as scanning at an angle, or scanning too close to completely cover the bar code). Thus, the ideal consumer-scanning symbology will facilitate easy intuitive scanning, and will survive an untrained operator's mistakes without these turning into decode errors (such as short reads) that could get into the system.

Traditional linear bar code symbologies are "framed" by relatively large areas, to the left and to the right of the bar code, that must be kept clear of all printing. These areas, called "Quiet Zones", provide technical benefits that make designing and scanning such symbologies easier. However, these Quiet Zones require additional space to be reserved for the barcode. Moreover, they prevent graphics or text from being tightly coupled to the barcode. This is a problem in the consumer scanning environment, where graphical and textual clues, placed immediately adjacent to the bar code, can help untrained consumer operators find the bar code within graphics, and help them understand what the result of scanning a given consumer barcode will be. Thus, the ideal consumer scanning symbology will allow text and graphics to be tightly coupled to the bar code, not kept distant from it.

Many traditional bar code applications need to fit the printed symbols in a relatively small area. Consumer scanning applications increase the importance of this requirement, as the bar codes will need to fit in constrained spaces such as to mark line items in catalogue tables, and to fit within a single line of text in a newspaper article. Thus, the ideal consumer scanning symbology needs to minimize both the height and the length of the printed bar code.

Many traditional bar code applications are cost-sensitive. However, consumer-scanning applications are extremely cost-sensitive. Thus, the ideal consumer scanning symbology can be scanned by a broad range of low-cost scanning technologies, and will be decodable by a low-cost, low-capability microprocessor system.

Most traditional bar code applications suffer from some variation in print quality, often resulting from attempts to save operating costs of label stock and regular printer maintenance. However, extremely poor print quality is usually avoided in business scanning situations, because of the need to maintain a good business relationship between the organization that prints the barcodes, and the organization that must scan them. Consumer-scanning applications are more likely to experience severe print quality problems for two reasons. First, the checks and balances between a supplier and a receiver in a business relationship will not be present in a consumer-scanning application. Second, consumer barcodes will be printed, not on labels, but on newspapers, in yellow pages, and on other forms of paper that are not amenable to high-accuracy printing. Thus, the ideal consumer scanning symbology can tolerate severe printing defects without an increased risk of false reads (mis-decodes).

Unlike with traditional bar code applications, consumer-scanning printing will often be done without benefit of professional expertise. A particular concern is that the traditional white-space requirements to the left and right of the barcode would often be ignored, in an attempt to fit the barcode into the requirements of a classified advertisement or other space-constrained application. Thus, the ideal consumer scanning symbology would be tolerant of text and graphics immediately adjacent to the bar code.

SUMMARY OF THE INVENTION

1. Objects of the Invention

It is a general object of the present invention to provide an improved bar code symbology.

It is another object of the invention to provide a bar code reader capable of reading the improved symbology.

It is a further object of the present invention to provide a printer for printing the improved symbology.

It is a still further object of the present invention to provide software capable of decoding the improved symbology.

It is an even further object of the invention to provide a method which can be used to accomplish one or more of the above objectives.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

It is an object of the present invention to provide a machine-readable symbology, in which consumer-friendly text and graphics may be printed in direct contact with the leftmost and rightmost bars of the symbol, and may even coincide with these leftmost and rightmost bars.

It is still another object of the present invention to provide a variable-length linear symbology that does not require large white spaces at either end of the bar code, and yet resists short-reads without needing to explicitly encode the length of the symbol.

It is an object of the present invention to provide a machine-readable symbology that includes a space-efficient "finder" pattern, that facilitates a rapid search through text and graphics without the need to perform arithmetic upon sums of multiple bars and spaces.

It is a goal of the present invention to provide a machine-readable symbology that includes space-efficient "Start" and "Stop" patterns, that are also unique patterns that cannot be found at any incorrect location within the bar code symbol, even if the symbol contains print defects, or has been scanned at an angle, or at the wrong distance (resulting in an out-of-focus or otherwise distorted signal).

2. Summary of the Invention

The present invention provides a bar code symbology derived from a set of patterns of bar and spaces in which each character spans a distance of m module widths and is represented by n bars and p spaces; and the largest single bar or space is limited to k modules in width, with a predetermined start pattern; a predetermined stop pattern; wherein the improvement consists of the exclusion from the set of valid patterns those patterns such that the predetermined start pattern is only at one end of a valid symbol, and the predetermined stop pattern is only at the other end of a valid symbol.

The present invention further provides a information bearing machine-readable carrier including a substrate; and a pattern of bars and spaces on said substrate in which each character spans a distance of m module widths and is represented by n bars and p interleaved spaces; and the largest single bar or space in a character is limited to k modules in width, with a predetermined start pattern; a predetermined stop pattern; wherein excluded from the set of valid patterns are those patterns such that the predetermined start pattern is only at one end of a valid symbol, and the predetermined stop pattern is only at the other end of a valid symbol.

The present invention further provides an imager for obtaining image data of a target in an image field the target including a symbol having a pattern of bars and spaces in which each character spans a distance of m module widths and is represented by n bars and p interleaved spaces; and the largest single bar or space in a character is limited to k modules in width, with a predetermined start pattern; a predetermined stop pattern; wherein excluded from the set of valid patterns are those patterns such that the predetermined start pattern is only at one end of a valid symbol, and the predetermined stop pattern is only at the other end of a valid symbol; and a decoder for processing the image data to derive the information contained in the symbol.

The novel features and characteristics of the invention are set forth in the appended claims. The invention itself, however, as well as other features and advantages thereof, will be vest understood by reference to a detailed description of a specific embodiment, when read in conjunction with the accompanying drawings.

DESCRIPTION OF THE PREFERRED EMBODIMENT

Figure 1:
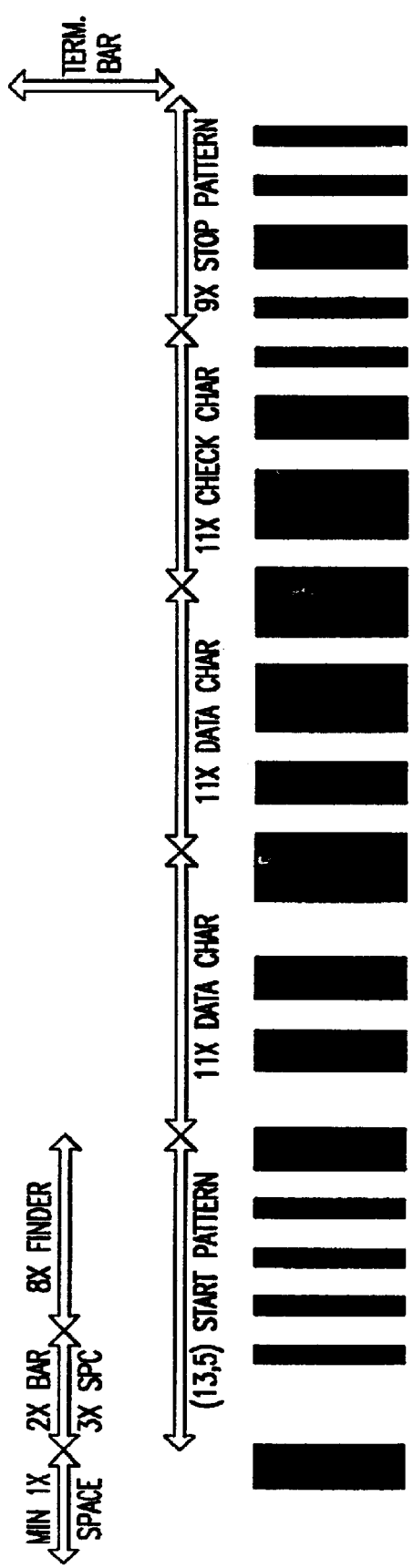
FIG. 1 shows a sample of the preferred embodiment of the disclosed symbology, encoding the digits "1234".

Every linear symbology uses sets of predefined bar/space patterns to encode information. The present invention uses a set of patterns with several characteristics in common to each pattern (called a "symbol character"). Each symbol character of the preferred embodiment consists of 3 bars and 3 interleaved spaces, and spans a total of 11 unit widths (or modules). The largest single bar or space in a pattern is limited to 4 modules in width; and (as a parity check to catch printing or scanning errors), the sum of the three bars of a pattern is always an even number. In the terminology commonly used in the literature, this may therefore be described as an (11,3,4,E) symbology. Code 128 uses all 108 possible patterns from the set of (11,3,4,E) patterns, whereas in the preferred embodiment, the present invention selects just 100 of these patterns to encode data, and three more that may only be used in the check-character position. The remaining (11,3,4,E) patterns are excluded in order to guarantee that, in the preferred embodiment, the defined Start pattern at the left end of the symbol, and the defined Stop pattern at the right end of the symbol, cannot also appear at any other point within the symbol.

Most linear symbologies known in the art rely on two large white spaces (called "Quiet Zones" or "Margins") to delineate the start and stop of the bar code. These spaces are usually about the width of a data character (each nominally 10× wide). Since these large spaces are much larger than the maximum space element allowed for the symbology, they help ensure that a false start or stop pattern within the barcode cannot result in a mis-decode or short read. Thus, for traditional symbologies, it is not important that the Start and Stop patterns be unique at off-boundary locations within the symbol.

The Appendix sets forth the specification of the symbology according to the preferred embodiment of this invention. It contains a table (Table 1) showing all of the patterns used to encode data according to the preferred embodiment. The specification also contains figures showing the start and stop patterns of the preferred embodiment. The Appendix adds a specific graphical element at the left end of the bar code (in fact, the graphic overlaps the leftmost bar of the symbol).

The first step in specifying and defining a symbology in accordance with the present invention is to select a character set with a sufficient number of distinct and reliably-decodable patterns to meet the requirements of the application. In the preferred embodiment, illustrated in FIG. 1, an (11,3,4,E) symbology was selected as the starting point, because it has a sufficient number of patterns (108) to encode pairs of digits efficiently. In this particular case, only 100 combinations are required to encode all the possible digit pairs. However, a robust check character should be a prime number, and 103 is the smallest prime that is equal to or greater than 100. To minimize the risk that a scanner would confuse the preferred embodiment with the standard Code 128, the present invention does not use the two (11,3,4,E) patterns that Code 128 uses for its Stop pattern. To further minimize the same risk, the present invention restricts the use of the three Code 128 Start patterns to appear only in the check character position (where they are adjacent to the present invention's Stop pattern, which is not a valid Code 128 data pattern).

The next step is to determine one or more patterns that can be excluded from appearing within any combinations of data patterns. In the case of the preferred embodiment, a pattern of six successive one-module elements (bar, space, bar, space, bar, space, all of unit width) was the starting point. This pattern can be excluded from appearing within any combination of undamaged (11,3,4,E) data characters, by eliminating just two of the possible patterns: the pattern starting with four narrow elements, and the pattern ending with four narrow elements. The resulting set of patterns, as used in the preferred embodiment, is shown in Table 1 of the attached specification. In the preferred embodiment, this pattern was extended to eight narrow elements, rather than six, so as to make it much less likely that this pattern would be falsely recognized when scanning other symbologies.

A pattern of all-narrow elements is not the only pattern that can be chosen within the scope of the present invention, but it has several technical advantages. It is, by definition, the smallest pattern for a given number of bars and spaces. Also, it is a pattern that cannot be created spuriously by the scanner, if scanning out of focus. A "blurred" signal can create spurious wide elements, for example by accidentally combining an all-narrow bar/space/bar sequence into one false three-module-wide bar. This phenomenon can be called a "merge" of elements. However, a blurred signal cannot create smaller elements out of larger ones.

A pattern of all-narrow elements must be long enough to avoid a printing problem, which can have the opposite effect as above: this phenomenon can be called a "split" of elements. A single print defect (a dark spot or a light void) can break up one large element into an apparent sequence of three narrow elements. Enough narrow elements must be defined in the pattern to ensure that, even in the presence of such a print defect, a data character cannot be mistaken for a start or stop pattern. In the preferred embodiment, the sequence of eight narrow elements avoids this problem, because even if a single wide element breaks up into three narrows, no data character or data character sequence contains five narrow elements adjacent to the wider element. It would take two print defects in neighboring wide elements to create a false pattern of all-narrow elements.

The chosen sequence of eight narrow elements is called the "Finder pattern" of the symbology (as shown in FIG. 1). The next step in the present invention is to add elements to the Finder pattern, if necessary, to ensure that it can be distinguished from other patterns in this and other symbologies, without requiring that sums of elements be compared. The reason for this requirement is so that low-cost microprocessors can efficiently parse a scan of data, and quickly find or eliminate this Finder pattern as a possibility. A low cost microprocessor typically has an 8-bit Arithmetic and Logic Unit (ALU). Individual bars and spaces can easily be measured and stored as single 8-bit quantities (using a sampling rate that supports adequate resolution over the full range of print densities and scanning distances). However, a sum of elements will often exceed the capacity of an 8-bit number, thus requiring 16-bit mathematics, which on an 8-bit processor can be too slow for acceptable performance.

In the prior art, in particular in the case of Channel Code, a Finder pattern of all-narrow elements has been utilized. However, scanners deal in relative, not absolute, measurements of bar and space widths, because the distance from the barcode (and thus the apparent size of the bars and spaces) is usually not known at the time of scanning. A first step in recognizing the pattern of the preferred embodiment is to examine neighboring individual elements of the same color, to detect a series of four like-sized bars, interleaved with a series of four like-sized spaces. Note that the bars and spaces are checked separately, because system ink spread could easily cause the series of bars to appear significantly larger than the interleaved spaces. However, once two interleaved series of "like" elements are found, the scanner requires some additional means for determining if a series of 8 elements represents 8 one-module elements, or 8 two-module elements. In the case of Channel Code, this was accomplished (to a reasonable degree of certainty) by comparing the total width of the supposed string of narrow elements to the total width of a series of adjacent elements, which should represent the adjacent data character.

In the present invention, the need for summing elements is avoided. The way this is done, is to define the full Start pattern of the symbology as consisting of the eight narrow elements of the Finder, combined with an adjacent pair of elements (a space and a bar) of predetermined relative widths. This allows the scanner to determine that the "like" elements are indeed single-module elements. In the preferred embodiment, the space is three modules wide and the bar is two modules wide. The purpose of the three-module space is that, in all of the linear symbologies in current usage, individual elements of the bar code are at most four modules wide. Therefore, a 3:1 ratio between two adjacent spaces cannot occur, unless the smaller space really is a 1-module space. In the preferred embodiment, the fixed wider bar is two modules wide, rather than three, so that these two wide elements are of different widths. This difference, between a nominal wide bar and a nominal wide space, never occurs in any of the "binary" codes such as Code 39. Thus, the specification of two different widths for the two "wide" elements next to the finder assures that the Start pattern of the preferred embodiment cannot be found by accident within a binary code.

A fast 8-bit finding algorithm can perform the basic search while considering only comparisons between adjacent elements of the same color. Without needing to perform any summing operations or other 16-bit math, virtually all false patterns can be quickly rejected, merely by finding four "similar" bar elements, preceded by a bar that is more than 1.5 times bigger than the smaller of the two adjacent bars, with a single interleaved space (next to the "large" bar) that is at least 2 times bigger than the next interleaved space. Then, a further 8 bit check can be made, that all four of the supposedly-narrow spaces are "similar" to each other in width. Only after all of these checks have passed, does it become prudent to perform some 16-bit math (e.g., to verify the expected 8:11 ratio between the Finder and the adjacent data character). One additional step can be executed, if an accurate determination is to be made that the adjacent space and bar are of widths 3 and 2, respectively, for the purpose of rejecting this pattern within binary codes. This step is to adjust the measured widths for uniform ink spread (because large amounts of ink spread can distort these ratios). The finder pattern, of eight successive equal-sized elements, forms an excellent "ink-spread gauge". The amount of ink spread can easily be calculated by finding the average bar width and the average space width in this series of equal-sized elements, and then adding or subtracting this average ink-spread number to adjust the widths of the adjacent space and bar before checking the 3:2 ratio.

The next concern addressed by the present invention is the need to define a variable-length symbology that minimizes the possibility of certain class of mis-decode known as a "short read." A short read can occur in some symbologies, notably Interleaved Two of Five, because the scan line was improperly aligned (and did not cover the entire printed bar code end to end). To prevent this sort of error, a Stop pattern must be selected that cannot be falsely created by a scan line that exits the barcode prematurely. In a symbology without required Quiet Zones, a short read could also occur because a printing defect caused a data character to falsely appear as the Stop pattern. Thus, in a no-Quiet-Zone variable-length symbology, special care must be taken to avoid short reads. In the prior art, a variable-length no-Quiet-Zone symbology known as RSS-Expanded has taken the approach of encoding the length of each symbol within itself (actually, encoding it redundantly using two different mechanisms to avoid a single decode error causing a short read). However, this approach significantly increases the size of the bar code. The present invention aims to prevent short reads via careful selection of a Stop pattern.

In traditional linear symbologies, which define large required white-space areas ("Quiet Zones") at both the left and right ends of the bar code, the rules for these Start and Stop patterns have been less strict. It has been sufficient to define start and stop patterns that are only unique on a character boundary, but that are not unique off-boundary. This has worked because these large white spaces "frame" the bar code within the scan line; should a print defect or blurred scanner signal caused too many or too few elements (due to a split or a merge) to appear between the quiet zones, this is easily detected, and the scan can be rejected. However, it is an aim of the present invention to work reliably without a requirement for the added print area of quiet zones. This requires that the Stop pattern be unique, both on-boundary and off-boundary (to withstand the effects of splits and merges), and also requires that a single printing defect cannot transform a data character into a Stop pattern, again whether on- or off-boundary.

In the preferred embodiment, a pattern similar to, but distinguishable from, the Finder pattern was chosen: the 8-element sequence (1,1,1,1,2,1,1,1) starting with a 1-module bar, and ending in a 1-module space (which is terminated by a bar of any width). When decoding a correctly printed and scanned symbol, this pattern is easily distinguished from the (11,3) data characters, because it only contains 7 modules, rather than 11, in its first six elements.

Unlike a standard Code 128 Stop pattern, this Stop pattern cannot even appear off-boundary (if a printing or scanning defect cause splits and/or merges, creating a wrong number of elements along the way). It can be seen by inspection that this pattern cannot be falsely created if off by two bars from the correct character boundary, because this could only cause a problem if a data character either began or ended with four narrow elements (but these have been excluded). If off by one bar position, then this pattern could only be created by a data character ending with (1,1) followed by a data character of (1,1,2,1,1,1). But this pattern, comprising only seven modules in total, is not a defined data character.

Other kinds of scanning and printing errors can also be considered, even in tandem, but will not create a false Stop pattern. For example, an angled scan exiting a data character cannot create this Stop pattern. Even on a scan that has gotten off-boundary via splits and merges, the closest match would be an off-by-one-bar scan that exited at the end of the character that starts with (1,1,2,1), but this character ends in (3,1), and so a scan exiting at this point cannot mimic the stop pattern. As a further example: there is a data character with the bar/space pattern (3,1,2,1,1,3). If a print defect splits the first bar into three, the resulting pattern is (1,1,1, 1,2,1,1,3), and the last space element is incorrect for a Stop pattern (and cannot be made correct by an angled scan line). Similarly, all of the other possible "splits" of data characters cannot make a false Stop pattern.

A different character set for the data characters could be utilized, so long as the patterns used for data are chosen so as to eliminate matches with the selected start and stop patterns. For example, an (11,3) code could be used, but where the selected patterns all are such that the sum of the bars are odd, rather than even. In this case, the Start and Stop patterns of the preferred embodiment could still be used.

A different (n,k) symbology (eg, the (4,17) patterns of PDF417), could be used as the starting point.

A different pair of start and stop patterns could be used, so long as the combination of data characters and start/stop patterns chosen still maintain the property that the data characters can not be misconstrued as start or stop patterns, even if scanned at an angle, or even if printing or scanning errors are introduced.

One skilled in the art can appreciate that many variations on the above symbology design can be made, without departing from the spirit of the current invention.

In addition to the symbology itself, the present invention is also concerned with implementing it on a carrier, reading and decoding it, printing it, and using its data in a communication network.

Figure 2:
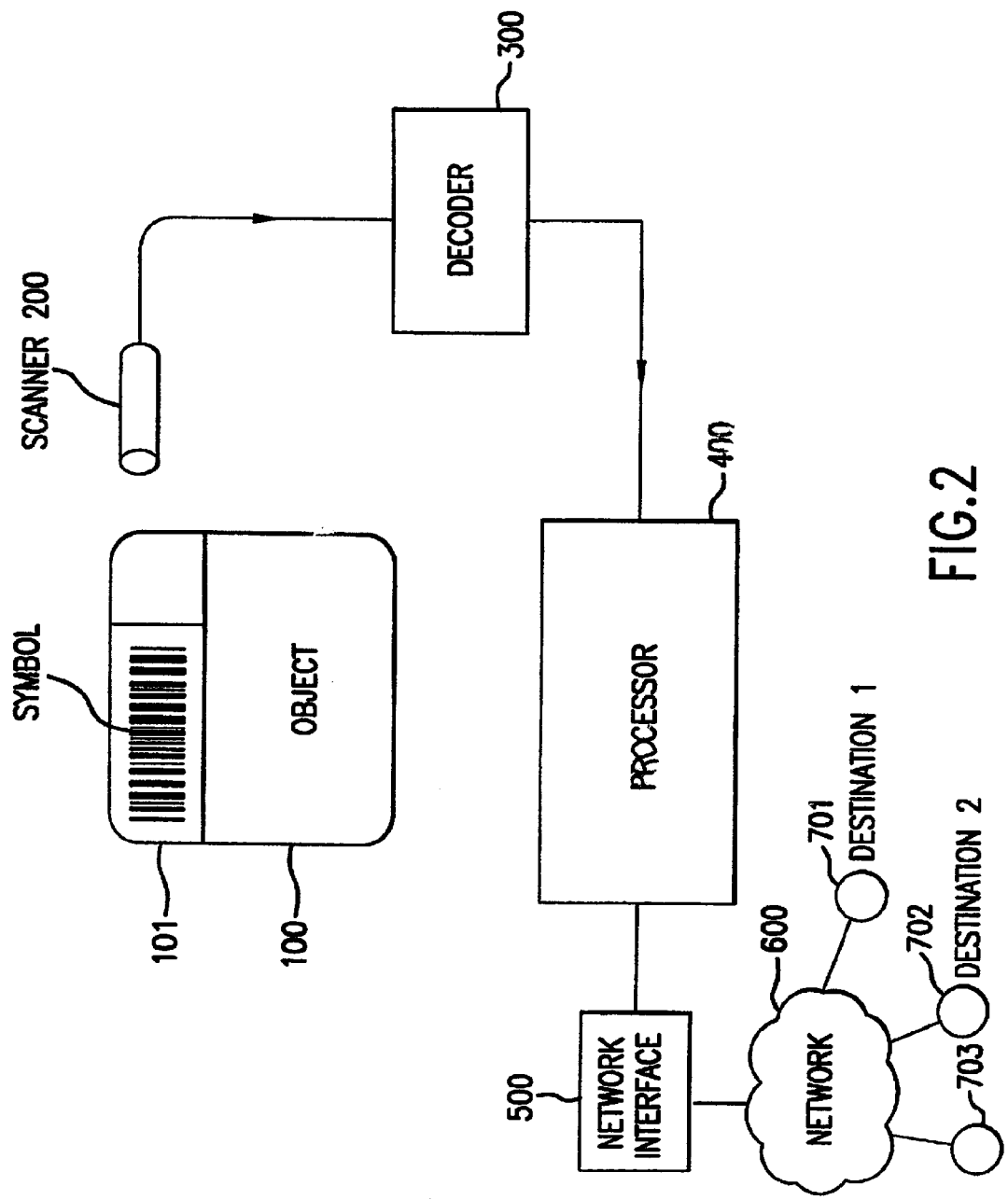
FIG. 2 shows an embodiment of the present invention in which the symbology is implemented on a carrier, and read by a scanner or reader.

Turing to FIG. 2, the symbology of the present invention may be implemented as a symbol 101 on a carrier 100. The symbol is read by a reader 200, and the data decoded in a decoder 300. A processor 400 may provide user interfaces and applications, which is then connected to a network interface 500 to transfer the data to a communications network 600 to various destinations 701, 702, 703.

Figure 3:
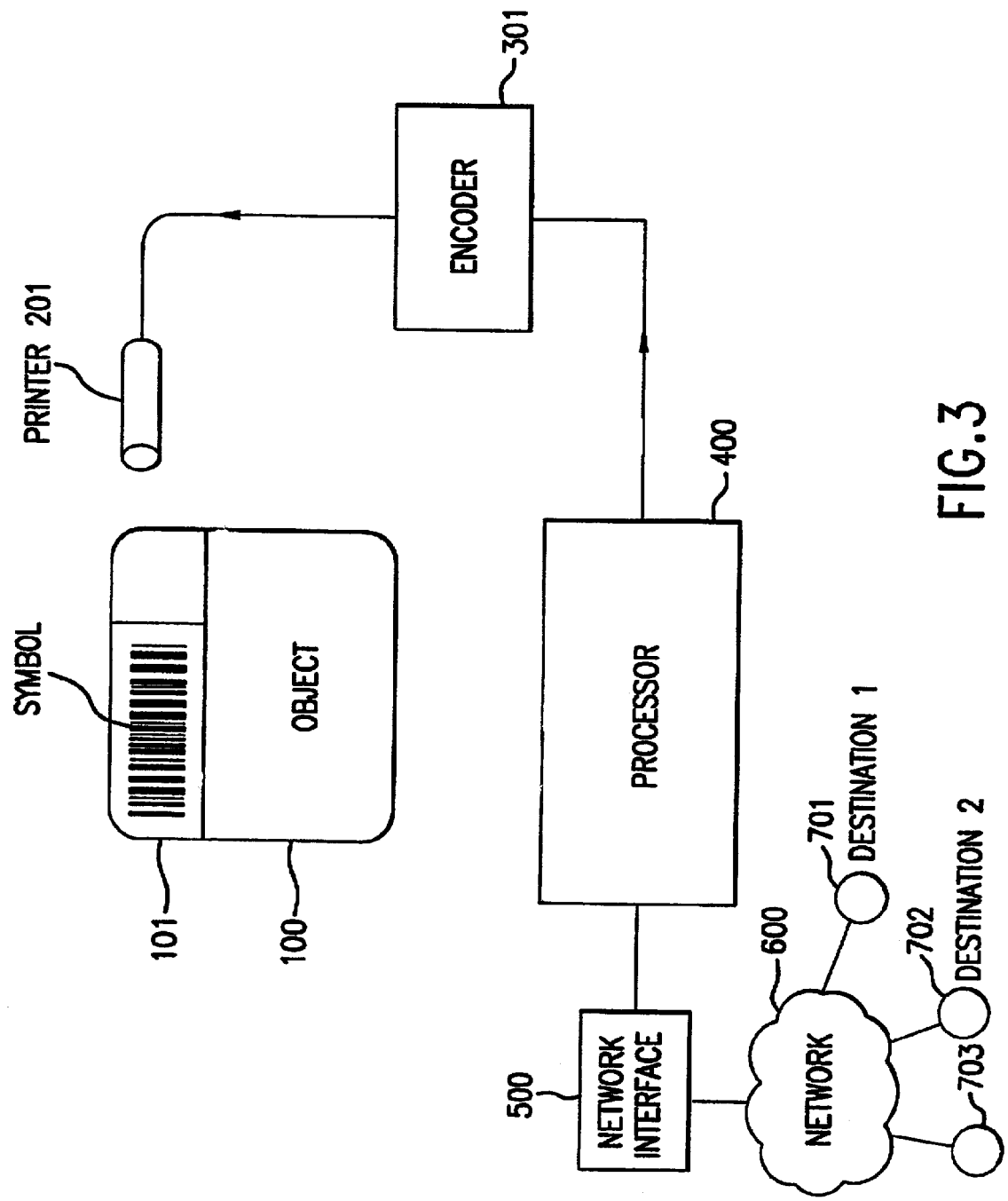
FIG. 3 shows an embodiment of the present invention in which the symbology is printed on a carrier.

Turing to FIG. 3, the symbology of the present invention may be printed as a symbol 101 on a carrier 100 by a printer 201. The data is encoded from an encoder 301. The encoder 301 may be connected to a processor 400 which provides user interfaces and applications and is also connected to a network interface 500 to allow the data to be encoded to be received from a communications network 600 and various sources 701, 702, 703 on the network.

Although the present invention has been described with respect to bar codes, and apparatus for reading and reproducing such bar code symbols on media, it is not limited to such embodiments. It is conceivable that the method of the present invention may also find application for use with various matching vision or optical character recognition applications in which information is derived from other types of indicia such as characters or from the surface characteristics of the article being scanned.

In all the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and elements such as a rotating or reciprocating mirror, and a photodetector component. Control or data lines associated with such components may be connected to an electrical connector mounted on the edge or external surface of the module to enable the module to be electrically connected to a mating connector associated with other elements of data acquisitions systems.

An individual module may have specific scanning or decoding characters associated with it, e.g. operability at a certain working distance, or operability with a specific symbology or printing destiny. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The following claims are intended to encompass all such uses, implementations, and embodiments.

APPENDIX

Preliminary Specification for

*Scanlets*

Symbol Technologies
- Subject to change without notice

Symbol Technologies
Rev 3.50
February, 2001

Symbol Technologies  ● ● Revision 3.50

*This page will be revised, once this specification has been submitted for standardization*

Symbol Technologies, Incorporated
One Symbol Plaza
Holtsville, NY 11742-1300
Telephone:  +1 631 738 2400
Website:    www.symbol.com Copyright © Symbol Technologies, Inc. 2000, 2001
Patents Pending All rights reserved. No part of this publication may be reproduced in any form, in an electronic retrieval system or otherwise, without the prior written permission of Symbol Technologies, Inc.

CAUTION: THIS SPECIFICATION MAY BE REVISED OR WITHDRAWN AT ANY TIME.

Scanlets

Symbol Technologies
Revision 3.50

Introduction

Scanlets, a linear symbology derived from Code 128, encode a numeric database key corresponding to a specific externally-assigned entity. A Scanlet has unique start and stop patterns so that it can be distinguished from standard Code 128. The start pattern is graphically designed to be easily recognizable by the general public, and visually distinguishable from standard barcodes. The use of the symbology is intended to comply with a specific application guideline; at the time this preliminary specification was drafted, Symbol Technologies, Inc serves as the contact for further information.

1. Scope

This specification defines the technical requirements for the bar code symbology known as Scanlets. It defines the symbology characteristics, data encodation, decoding algorithm, dimensions and print quality requirements.

2. Normative references

This specification incorporates by undated reference provisions from other publications. The latest edition of the publication referred to applies.

ISO 646                        ISO 7-bit Code for Information Interchange
ISO/IEC 15416             Bar Code Print Quality Test Specification – Linear Symbols
EN 1556                    Bar Coding – Terminology
AIM Inc. Technical Specification    International Symbology Specification – Code 128

3. Definitions

For the purposes of this specification, the definitions in EN 1556 shall apply. The following definitions also apply to this specification.

3.1. Finder

A pattern of eight one-module elements, beginning with a bar, near the left end of a Scanlet, which the decode algorithm finds as the first step in decoding a Scanlet.

3.2. Graphic/Start Pattern

The combination of graphical elements, including the Interface Graphic and the Finder, forming a unique pattern on the left side of every Scanlet. The characteristic ratios formed by this pattern were designed to be easily recognizable, both algorithmically and visually.

3.3. Interface Graphic

A graphic design forming the left end of a Scanlet, which provides a portion of the Start pattern, and which also provides a visual user interface to facilitate recognition by the general public.

3.4. Start pattern

A pattern consisting of a 2-module bar, followed by a 3-module space, followed by the eight one-module elements of the Finder. The leftmost bar of this pattern is also the rightmost dark element of the Interface Graphic.

3.5. Stop pattern

A pattern consisting of eight elements over nine modules, at the right end of a Scanlet

3.6. terminating bar

A dark element adjacent to the last space of the Stop pattern. This dark element may be any width between one and four modules, and is followed by a minimum one-module space. The terminating bar can be part of a larger graphic element to the right of a Scanlet.

Scanlets
page 3

Symbol Technologies                                                          Revision 3.50

4. Requirements

4.1. Symbology Characteristics

The characteristics of Scanlets are:
a) Encodable Character set: numeric only, using a subset of the Code 128 symbol character patterns to encode two digits per symbol character
b) Code type: Continuous
c) Elements per symbol character: 6, comprising 3 bars and 3 spaces, each of 1, 2, 3, or 4 modules in width. The Finder/Start pattern consists of five bars and five spaces for a total of 13 modules. The Stop pattern is comprised of four bars and four spaces for a total of nine modules, terminated by a bar whose width is not critical.
d) Character Self-checking: Yes
e) Symbol Length: Variable, encoding between 4 and 14 data digits inclusive
f) Bidirectionally decodable: Yes
g) Symbol Check Character: One, mandatory (see Annex A.1).
h) Data Character Density: 5.5 modules per encoded digit

4.2. Symbol Structure

Scanlets shall comprise:
a) a Graphic/Start pattern, consisting of:
   - an Inteface Graphic element, as shown in Figure 1, ending in a two-module-wide bar (preceded by a space that shall be 2X wide or wider)
   - a three-module space
   - an eight-module Finder pattern. The Start pattern is composed of this Finder pattern, plus the preceding two-module bar and three-module space.
b) between two and seven Code 128 symbol characters, each representing two digits (only an even number of digits may be encoded)
c) a modulo 103 symbol check character
d) a Stop pattern consisting of 8 elements, for a total of 9 modules
e) a terminating bar (1 to 4 modules wide), followed by a minimum 1X space Figure 1 illustrates a minimum-length Scanlet encoding "0123".

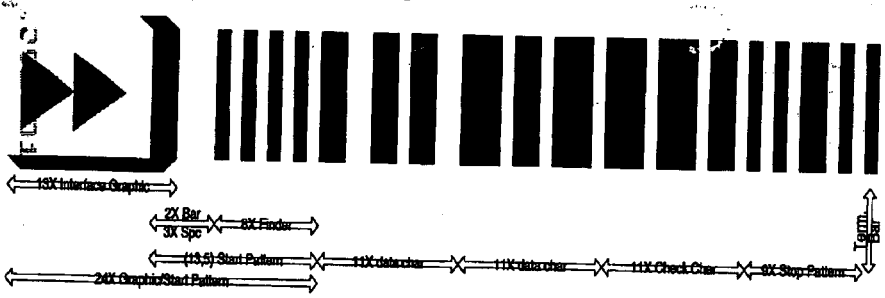

Figure 1 – a Scanlet, with each component identified

4.3. Character assignments

Table 1 defines all the Scanlet symbol character assignments. The symbol character value assignments are identical to the standard Code 128 assignments, and use the same patterns of bars and spaces for each value. However, within a Scanlet, three of the Code 128 symbol characters (those with values of 33, 62 and 92) are never used, in order to ensure the uniqueness of the Finder pattern within a Scanlet. Code 128 symbol characters with values of 0 through 102 (excluding 33, 62 and 92) are used to encode numeric data (using the "Scanlet Value" column of Table 1). Three additional symbol characters, the Code 128 symbol characters with values of 103, 104, and 105, are only used in the check character position, to encode check values of 100, 101, and 102, respectively. The Code 128 forward and reverse Stop patterns are not used within Scanlets. In the columns of Table 1 headed "B" or "S" the numeric values represent the widths of the bar or space elements in modules, or multiples of the X dimension.

Scanlets page 4

Symbol Technologies — Revision 3.50

Table 1 – Scanlet Character Encodation

| C128 Value | Scanlet Value | B | S | B | S | B | S | C128 Value | Scanlet Value | B | S | B | S | B | S |
|---|---|---|---|---|---|---|---|---|---|---|---|---|---|---|---|
| 00 | 00 | 2 | 1 | 2 | 2 | 2 | 2 | 53 | 52 | 2 | 1 | 3 | 1 | 3 | 1 |
| 01 | 01 | 2 | 2 | 2 | 1 | 2 | 2 | 54 | 53 | 3 | 1 | 1 | 1 | 2 | 3 |
| 02 | 02 | 2 | 2 | 2 | 2 | 2 | 1 | 55 | 54 | 3 | 1 | 1 | 3 | 2 | 1 |
| 03 | 03 | 1 | 2 | 1 | 2 | 2 | 3 | 56 | 55 | 3 | 3 | 1 | 1 | 2 | 1 |
| 04 | 04 | 1 | 2 | 1 | 3 | 2 | 2 | 57 | 56 | 3 | 1 | 2 | 1 | 1 | 3 |
| 05 | 05 | 1 | 3 | 1 | 2 | 2 | 2 | 58 | 57 | 3 | 1 | 2 | 3 | 1 | 1 |
| 06 | 06 | 1 | 2 | 2 | 2 | 1 | 3 | 59 | 58 | 3 | 3 | 2 | 1 | 1 | 1 |
| 07 | 07 | 1 | 2 | 2 | 3 | 1 | 2 | 60 | 59 | 3 | 1 | 4 | 1 | 1 | 1 |
| 08 | 08 | 1 | 3 | 2 | 2 | 1 | 2 | 61 | 60 | 2 | 2 | 1 | 4 | 1 | 1 |
| 09 | 09 | 2 | 2 | 1 | 2 | 1 | 3 | 62 | N/A | 4 | 3 | 1 | 1 | 1 | 1 |
| 10 | 10 | 2 | 2 | 1 | 3 | 1 | 2 | 63 | 61 | 1 | 1 | 1 | 2 | 2 | 4 |
| 11 | 11 | 2 | 3 | 1 | 2 | 1 | 2 | 64 | 62 | 1 | 1 | 1 | 4 | 2 | 2 |
| 12 | 12 | 1 | 1 | 2 | 2 | 3 | 2 | 65 | 63 | 1 | 2 | 1 | 1 | 2 | 4 |
| 13 | 13 | 1 | 2 | 2 | 1 | 3 | 2 | 66 | 64 | 1 | 2 | 1 | 4 | 2 | 1 |
| 14 | 14 | 1 | 2 | 2 | 2 | 3 | 1 | 67 | 65 | 1 | 4 | 1 | 1 | 2 | 2 |
| 15 | 15 | 1 | 1 | 3 | 2 | 2 | 2 | 68 | 66 | 1 | 4 | 1 | 2 | 2 | 1 |
| 16 | 16 | 1 | 2 | 3 | 1 | 2 | 2 | 69 | 67 | 1 | 1 | 2 | 2 | 1 | 4 |
| 17 | 17 | 1 | 2 | 3 | 2 | 2 | 1 | 70 | 68 | 1 | 1 | 2 | 4 | 1 | 2 |
| 18 | 18 | 2 | 2 | 3 | 2 | 1 | 1 | 71 | 69 | 1 | 2 | 2 | 1 | 1 | 4 |
| 19 | 19 | 2 | 2 | 1 | 1 | 3 | 2 | 72 | 70 | 1 | 2 | 2 | 4 | 1 | 1 |
| 20 | 20 | 2 | 2 | 1 | 2 | 3 | 1 | 73 | 71 | 1 | 4 | 2 | 1 | 1 | 2 |
| 21 | 21 | 2 | 1 | 3 | 2 | 1 | 2 | 74 | 72 | 1 | 4 | 2 | 2 | 1 | 1 |
| 22 | 22 | 2 | 2 | 3 | 1 | 1 | 2 | 75 | 73 | 2 | 4 | 1 | 2 | 1 | 1 |
| 23 | 23 | 3 | 1 | 2 | 1 | 3 | 1 | 76 | 74 | 2 | 2 | 1 | 1 | 1 | 4 |
| 24 | 24 | 3 | 1 | 1 | 2 | 2 | 2 | 77 | 75 | 4 | 1 | 3 | 1 | 1 | 1 |
| 25 | 25 | 3 | 2 | 1 | 2 | 2 | 1 | 78 | 76 | 2 | 4 | 1 | 1 | 1 | 2 |
| 26 | 26 | 3 | 2 | 1 | 2 | 2 | 1 | 79 | 77 | 1 | 3 | 4 | 1 | 1 | 1 |
| 27 | 27 | 3 | 1 | 2 | 2 | 1 | 2 | 80 | 78 | 1 | 1 | 1 | 2 | 4 | 2 |
| 28 | 28 | 3 | 2 | 2 | 1 | 1 | 2 | 81 | 79 | 1 | 2 | 1 | 1 | 4 | 2 |
| 29 | 29 | 3 | 2 | 2 | 1 | 1 | 1 | 82 | 80 | 1 | 2 | 1 | 2 | 4 | 1 |
| 30 | 30 | 2 | 1 | 2 | 1 | 2 | 3 | 83 | 81 | 1 | 1 | 4 | 2 | 1 | 2 |
| 31 | 31 | 2 | 1 | 2 | 1 | 2 | 1 | 84 | 82 | 1 | 2 | 4 | 1 | 1 | 2 |
| 32 | 32 | 2 | 3 | 2 | 1 | 2 | 1 | 85 | 83 | 1 | 2 | 4 | 2 | 1 | 1 |
| 33 | N/A | 1 | 1 | 1 | 3 | 2 | 3 | 86 | 84 | 4 | 1 | 1 | 2 | 1 | 2 |
| 34 | 33 | 1 | 3 | 1 | 1 | 2 | 3 | 87 | 85 | 4 | 2 | 1 | 1 | 1 | 2 |
| 35 | 34 | 1 | 3 | 1 | 3 | 2 | 1 | 88 | 86 | 4 | 2 | 1 | 2 | 1 | 1 |
| 36 | 35 | 1 | 1 | 2 | 3 | 1 | 3 | 89 | 87 | 2 | 1 | 2 | 1 | 4 | 1 |
| 37 | 36 | 1 | 3 | 2 | 1 | 1 | 3 | 90 | 88 | 2 | 1 | 4 | 1 | 2 | 1 |
| 38 | 37 | 1 | 3 | 2 | 3 | 1 | 1 | 91 | 89 | 4 | 1 | 2 | 1 | 2 | 1 |
| 39 | 38 | 2 | 1 | 1 | 3 | 1 | 3 | 92 | N/A | 1 | 1 | 1 | 1 | 4 | 3 |
| 40 | 39 | 2 | 3 | 1 | 1 | 1 | 3 | 93 | 90 | 1 | 1 | 1 | 3 | 4 | 1 |
| 41 | 40 | 2 | 3 | 1 | 3 | 1 | 1 | 94 | 91 | 1 | 3 | 1 | 1 | 4 | 1 |
| 42 | 41 | 1 | 1 | 2 | 1 | 3 | 3 | 95 | 92 | 1 | 1 | 4 | 1 | 1 | 3 |
| 43 | 42 | 1 | 1 | 2 | 3 | 3 | 1 | 96 | 93 | 1 | 1 | 4 | 3 | 1 | 1 |
| 44 | 43 | 1 | 3 | 2 | 1 | 3 | 1 | 97 | 94 | 4 | 1 | 1 | 1 | 1 | 3 |
| 45 | 44 | 1 | 1 | 3 | 1 | 2 | 3 | 98 | 95 | 4 | 1 | 1 | 3 | 1 | 1 |
| 46 | 45 | 1 | 1 | 3 | 3 | 2 | 1 | 99 | 96 | 1 | 1 | 3 | 1 | 4 | 1 |
| 47 | 46 | 1 | 3 | 3 | 1 | 2 | 1 | 100 | 97 | 1 | 1 | 4 | 1 | 3 | 1 |
| 48 | 47 | 3 | 1 | 3 | 1 | 1 | 2 | 101 | 98 | 3 | 1 | 1 | 1 | 4 | 1 |
| 49 | 48 | 2 | 1 | 1 | 3 | 3 | 1 | 102 | 99 | 4 | 1 | 1 | 1 | 3 | 1 |
| 50 | 49 | 2 | 3 | 1 | 1 | 3 | 1 | 103 | (100) | 2 | 1 | 1 | 4 | 1 | 2 |
| 51 | 50 | 2 | 1 | 3 | 1 | 3 | 1 | 104 | (101) | 2 | 1 | 1 | 2 | 1 | 4 |
| 52 | 51 | 2 | 1 | 3 | 3 | 1 | 1 | 105 | (102) | 2 | 1 | 1 | 2 | 3 | 2 |

Scanlets page 5

Symbol Technologies  
Revision 3.50

4.3.1. Symbol character structure

This section describes the structure of the Code 128 symbol characters that are utilized within a Scanlet to encode numeric data and a modulo 103 checksum. The unique Start and Stop patterns of Scanlets are specified in sections 4.3.6 and 4.3.7 of this specification.

The sum of the bar modules in any Code 128 symbol character shall always be even (even parity) and that of the space modules is therefore always odd. This even parity feature enables character self-checking to be carried out.

Figure 2 illustrates the encodation of the pair of digits "34" in a Scanlet using symbol character 35.

Figure 2 – Example of symbol character 35, representing "34" in a Scanlet

4.3.2. Data character encodation

Each Scanlet symbol character represents two digits in the range "00" through "99" that directly correspond to the "Scanlet Value" column of Table 1. The encodation of pairs of data digits is identical to that utilized in Code 128 in Code Set C, except that data digits above "32" are encoded by a symbol character value equal to (decimal value + 1), data digits above "60" are encoded as (decimal value + 2), and data digits above "89" are encoded as (decimal value + 3). Scanlets do not use Code 128 code sets A and B, and therefore cannot encode non-numeric data.

4.3.3. Code Sets

Each Scanlet begins by default in the numeric Code Set C, and this code set cannot be changed within a Scanlet.

4.3.4. Special characters

None of the Code 128 special characters may appear within a Scanlet. Therefore, none of Code 128's special features (which require the use of Function Characters) are supported.

4.3.5. Symbol check character

The symbol check character shall be included as the last symbol character, immediately followed by the Stop pattern. Annex A.1 defines the algorithm for its calculation. The symbol check character shall not be transmitted by the decoder.

4.3.6. Finder pattern and Start pattern

The Finder pattern consists of eight one-module-wide elements, four dark elements and four interleaved light elements, as shown in Figure 1. The Start pattern consists of a two-module bar (which is part of the Interface Graphic at the left end of a Scanlet), followed by a three-module space, followed by the eight elements of the Finder pattern. The module widths of the Start pattern elements form the sequence 2,3,1,1,1,1,1,1,1,1. The leading two-module bar is preceded by a minimum 2-module space within the Interface Graphic.

4.3.7. Stop pattern

The Stop pattern consists of eight alternating dark and light elements, starting with a bar. The module widths of the Stop pattern elements form the sequence 1,1,1,1,2,1,1,1. These are followed by a terminating bar or other dark graphical element, between one and four modules wide, whose function is to delineate the one-module width of the last space of the Stop pattern.

4.3.8. Interface Graphic pattern

The Interface Graphic pattern at the left end of a Scanlet, as shown in Figure 1, consists of two adjacent dark triangles, bordered by a reverse 'L' which extends 1X above and 1X below the bars of the body of the Scanlet. The bottom edge of the reverse 'L' is nominally 1X high and 13X wide, but is tapered at both ends as shown in Figure 1. The right edge of the reverse 'L' shall be 2X wide throughout the central 10X of its height, but is tapered at the top and bottom as shown in Figure 1. The triangles are each 4X wide, nominally 6X high (but this is not a critical dimension), and shall be positioned vertically so as to Scanlets  
page 6

Symbol Technologies  Revision 3.50 be centered within the height of the bars of the body of the Scanlet. The rightmost triangle ends 2X to the left of the 2X vertical portion of the reverse 'L'.

4.4. Dimensional Requirements

A Scanlet needs to be easily recognized visually by the general public, even when interspersed within text or graphics, and therefore it is important that Scanlets be printed within a constrained range of sizes and symbol aspect ratios.

4.4.1. Module width (X)

The X dimension shall be constant throughout a given symbol. Other dimensional requirements for Scanlets are specified in section 4.7.1.

4.4.2. Symbol height (Y)

The height of the bars within the body of a Scanlet shall nominally be 10X, with the Interface Graphic extending 1X above and 1X below. Other dimensional requirements for Scanlets are specified in section 4.7.1.

4.5. Reference decode algorithm

Bar code reading systems are designed to read imperfect symbols to the extent that practical algorithms permit. This section describes the reference decode algorithm used in the computation of the decodability value described in ISO/IEC 15416.

A candidate Scanlet can be found within a scan line of bar and space measured values, by using the following steps (see Figure 3 for a representation of the measurements needed to find and validate a Start pattern):

1. To find a Scanlet, perform the following steps at each bar position:
   a) sum the widths of the next (8+6) elements starting from the current bar position, then divide by (8+11) to obtain "Z", the average module width. Check for a leading Finder pattern with seven edge-to-similar-edge distances between 1.5Z and 2.5Z. For the Scanlet Finder pattern shown in Figure 3, this step consists of computing $Z = (f1+f3+f5+f7+e1+e3+e5)/19$ and checking that f1 through f7 are each between 1.5Z and 2.5Z
   b) To look also for a possible reverse scan, sum the current bar width and the prior thirteen element widths, and divide by 19 to obtain "Z", the average module width. Check for a trailing Finder pattern with seven edge-to-similar-edge distances between 1.5Z and 2.5Z.

2. To verify the leading elements of the Start pattern, first recalculate Z (to minimize acceleration error) as:

$Z = (f1+f3+f5+f7)/8$

Then check that t1 is between 4.5Z and 5.5Z, and that t2 is between 3.5Z and 4.5Z

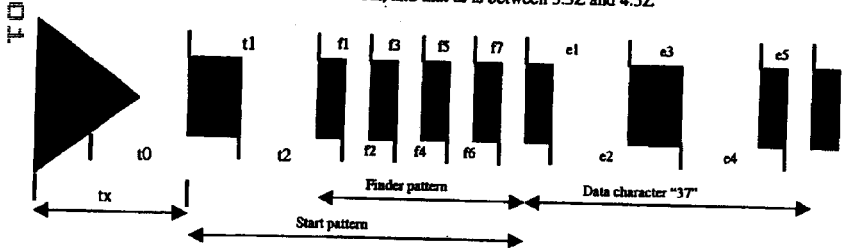

Figure 3 – Start pattern decode measurements

3. It is possible that a 3-module space, and then a 2-module bar, may be found at both ends of the Finder's series of eight narrow elements. As illustrated in Figure 3, this can occur if the first data character has a Scanlet symbol character value of either 8, 36, 37, or 43, because these are the only characters that begin with a (1, 3, 2) pattern. If so, and if enough additional elements are present within the scan line for a valid Scanlet to exist both to the left and to the right of the Finder, then one of the possibilities (i.e., a forward Start or reverse Start) can be discarded by examining the next series of 6 elements, which should represent the first data character. One of two cases will occur:

Scanlets
page 7

Symbol Technologies                                                                 Revision 3.50 a) If the scan line missed the triangles of the Interface Graphic, then the total width of these six elements will be at least twice the width of the eight Finder elements, and the false character can be rejected immediately.

b) If the scan line crossed the triangle, then the apparent character widths may not be rejected in either direction. In this case, decode both character candidates, using the algorithm of section 4.5.1. In the correct scan direction, these will constitute a valid 11-module-wide data character with a Scanlet symbol character value of either 8, 36, 37, or 43. In the incorrect direction, however, the last three of these six elements are part of the Interface Graphic, and the character decode algorithm will take the measurements t2, t1, t0, and tx shown in Figure 3. Note that a scan through the right triangle will result in a tx measurement that is always six modules wide. However, all four of the characters starting with (1, 3, 2) have an e4 of four modules or less. Reject the scan direction in which one of the four listed characters cannot be decoded.

Set the scan direction based on the validated 2X/3X bar/space pair.

4. Verify that a valid Stop pattern was scanned, starting n elements past the Finder pattern, where n is an even multiple of six, in the range of 18 to 48 inclusive. Search by summing each set of six elements until a set is reached that is less than 75 percent of the width of the previous group. The Stop pattern decodes as a T sequence of 2,2,2,3,3,2,2, when normalized to nine modules.

5. Beginning at the inner end of the Finder pattern, decode the succeeding groups of six elements as standard Code 128 symbol characters in the direction determined from step 3, using the algorithm of section 4.5.1. Continue until either an invalid data character pattern is detected, or until the position of the Stop pattern has been reached. If a group of six elements is of the proper width for a data character, but decodes to a Code 128 value of 33, 62, or 92, the character is invalid. Unless in the check character position, values greater than 102 are also invalid.

6. Verify that the symbol check character calculated is correct. In addition, verify that the symbol contained at least three symbol characters (including the check character, but excluding the Start and Stop patterns) and at most eight symbol characters.

7. Translate the symbol characters into a string of digits. Each symbol character translates directly into a pair of digits (from the "Scanlet Value" column of Table 1), in the range of "00" through "99".

8. In addition, perform such other secondary checks on quiet zones, beam acceleration, absolute timing, dimensions, etc., as are deemed prudent and appropriate considering the specific reading device and intended application environment.

NOTE: in this algorithm the symbol is decoded using "edge to similar edge" measurements, plus an additional measurement of the sum of the three bar widths to check the parity of each symbol character.

4.5.1. Character decode algorithm

Use the following steps to decode each (11,3) character within a Scanlet:

1. Calculate eight width measurements $p, e_1, e_2, e_3, e_4, b_1, b_2,$ and $b_3$ (see Figure 4).

2. Convert measurements $e_1, e_2, e_3,$ and $e_4$ to normalized values $E_1, E_2, E_3,$ and $E_4$ which will represent the integral module width $(E_i)$ of these measurements. The following method is used for the i-th value.

If $1.5p/11 \leq e_i < 2.5p/11$, then $E_i = 2$.
If $2.5p/11 \leq e_i < 3.5p/11$, then $E_i = 3$.
If $3.5p/11 \leq e_i < 4.5p/11$, then $E_i = 4$.
If $4.5p/11 \leq e_i < 5.5p/11$, then $E_i = 5$.
If $5.5p/11 \leq e_i < 6.5p/11$, then $E_i = 6$.
If $6.5p/11 \leq e_i < 7.5p/11$, then $E_i = 7$.

Otherwise the character is in error.

3. Look up the character in a decode table using the four values $E_1, E_2, E_3,$ and $E_4$ as the key. This decode table may be found in the Code 128 specification, or may be derived directly from Table 1. If using the decode table in the Code 128 specification, note that the $STOP_A$ and $STOP_B$ patterns are invalid when decoding a Scanlet.

4. Retrieve character self-checking value V which is stored in the table with the character (or which can be derived directly from Table 1). The value V is equal to the sum of the modules for the bars as defined for that character.

5. Verify that
$(V-1.75)p/11 < (b1 + b2 + b3) < (V+1.75)p/11$

Scanlets

Symbol Technologies  Revision 3.50
Otherwise the character is in error.

The calculation indirectly uses character parity to detect all decode errors caused by single non-systematic one-module edge errors.

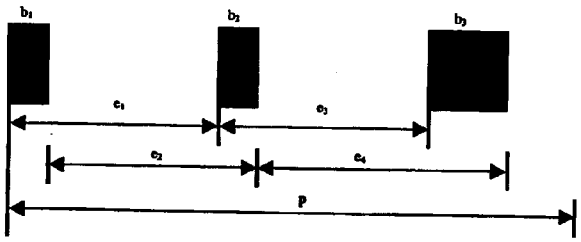

Figure 4 – Character decode measurements

4.6. Symbol quality

4.6.1. General

The ISO/IEC 15416 specification defines a standardized methodology for measuring and grading bar code symbols. Scanlets shall be evaluated according to that standard. The reference decode algorithm defined in section 4.5 of this specification shall be used for the assessment of the "decode" and "decodability" parameters under ISO/IEC 15416.

4.6.2. Decodability

For the calculation of the decodability value $V_c$ for each symbol character, excluding the start and stop patterns, the following provisions apply, in addition to those in ISO/IEC 15416:

Substitute V1 for $V_c$ in the formula $V_c = K / (S / 2n)$, in Annex A of ISO/IEC 15416.

Calculate V2:

$$V2 = \frac{1.75 - (ABS((W_b \times 11 / S) - M))}{1.75}$$

Where: M = number of dark modules in the character.
S = total width of the character
$W_b$ = sum of the bar widths in the character $V_c$ is the lesser of V1 and V2.

The Start pattern consists of five bars and five spaces comprising 13 modules. The Stop pattern consists of four bars and four spaces comprising nine modules, terminated by a dark element at least one module wide. The decodability of the Start and Stop patterns shall be measured using the standard formula for $V_c$ given above, but substituting n = 13 or n = 9, rather than n = 11, to reflect the lengths of those patterns. For the purpose of measuring decodability, the terminating bar after the Stop pattern is not measured (but is checked as an additional criterion; see section 4.6.3).

4.6.3. Additional criteria

ISO/IEC 15416 allows for additional pass/fail criteria to be stipulated by a symbology specification. For Scanlets, additional criteria for each scan profile are given below. Any individual scan profile which does not meet the requirements below shall receive a grade of "F" or "0" (zero).

4.6.3.1. Start pattern

The seven edge-to-similar-edge distances in the Finder pattern shall each be 2.0 +/- 0.315Z, the measurement labeled t1 in Figure 3 shall be 5.0 +/- 0.315Z, and the measurement labeled t2 in Figure 3 shall be 4.0 +/- 0.315Z. For these measurements, Z is the average measured module width over the eight modules of the Finder Pattern.

Scanlets  
page 9

Symbol Technologies  Revision 3.50

4.6.3.2. Terminating bar

The width of the terminating dark element to the right of the Stop pattern shall be at least 1X wide, but no more than 4X wide. An extra edge-to-similar-edge measurement T, summing the last space of the Stop pattern and the terminating dark element, shall be made on each scan reflectance profile. Using the value of Z from the Stop pattern, each scan reflectance profile under ISO/IEC 15416 shall be measured and graded as follows:

T >= 1.685Z and T <= 5.75Z: Grade 4
T < 1.685Z or T > 5.75Z: Grade 0

4.7. Application parameters

The Scanlet application defines the additional parameters specified in this section.

4.7.1. Symbology and dimensional characteristics

In order for Scanlets to be printed and be scannable in the intended application, the following parameters have been specified:

a) Only numeric data is encoded
b) A minimum of four digits, and a maximum of 14 digits, may be encoded
c) A symbol check character is required, but no additional data check character is used
d) Scanlets shall be printed at a nominal X dimension of no less than 0.17mm (6.7 mils). However, to match the dot pitch of a given printer or imagesetter, the X dimension may be reduced below the minimum by one printer dot, so long as the resulting X dimension exceeds 0.15mm (6.0 mils). The nominal X dimension shall be no greater than 0.38 mm (15 mils). However, to match the dot pitch of a given printer or imagesetter, the X dimension may be increased above the maximum, so long as the resulting X dimension does not exceed 0.44mm (17.25 mils).
e) Scanlets shall be printed at a nominal height equal to 12 times the X dimension, which height includes the extended height of the Interface Graphic portion of the Graphic/Start pattern. The height of the bars within the body of a Scanlet shall nominally be 10X. However, when printing at an X dimension of less than 0.25mm (10mils), the bar height may be increased to a maximum of 2.5mm (0.1 inch) and the Interface Graphic height increased proportionately to a maximum of 3.0mm (0.12 inch).
f) A 1X quiet zone is required above and below the 10X-high bars of the Scanlet (but no Quiet Zone is required above or below the 12X-high graphic portion at the left end of the Scanlet.
g) No Code 128 special function characters may be encoded in a Scanlet.
h) A human readable interpretation of the encoded data is not required. If printed, the human readable interpretation shall be printed at a minimum distance of 1X from the bars of the Scanlet, and a minimum of 1X from the Interface Graphic. The symbol check character shall not be printed as part of the human readable interpretation, but a key-entry check digit shall be added, as specified in Annex A.2.
i) White is the recommended background color for Scanlets (i.e., for spaces). Other background colors may be used, if they are "warm" colors (using magenta and/or yellow inks, but not cyan or black ink). Patterns and textures shall not appear within the spaces of Scanlets. Black ink shall be used for the dark areas (bars) of Scanlets, and for the "reverse L" of the Interface Graphic. However, the triangles within the Interface Graphic may be printed in either black, red or gray. The specification for the red, if used, is defined in terms of PostScript color spaces. If using the RGB color space, then the red is RGB 1.0, 0.0, 0.0. This directly translates to the PostScript CMYK color space as CMYK 0.0, 1.0, 1.0, 0.0 (note that neither Cyan nor Black ink will be used). Analogous CMYK colors with equal percentages of magenta and yellow (such as an M88, Y88 Red) are permissible. The gray value, if used, is the equivalent gray value for the specified RGB value (1.0, 0.0, 0.0), computed according to the NTSC video standard. This standard determines how a color television signal is rendered on a black-and-white television set (*gray* = 0.3 *red* + 0.59 *green* + 0.11 *blue*). Thus, the specified gray value, in the PostScript DeviceGray color space, is 0.3. Note that PostScript programs will automatically convert RGB(1,0,0) red to the proper CMYK or Gray values as needed.

4.7.2. Test specification

This section specifies the parameters for the evaluation of symbol quality by specifying a quality grade in accordance with ISO/IEC 15416.

This grade shall be expressed in the form:

2.5 / 5 / 660 where  2.5 represents the overall symbol quality grade (1.5 is the minimum acceptable grade in this application)

Symbol Technologies • Revision 3.50

5 is the measuring aperture reference number, representing 0.125mm (or 5 mils) diameter, which is the aperture that should always be used in this application.
660 is the peak response wave length in nanometers.

4.8. Transmitted data

The data transmitted from a Scanlet reader may include application-specific data and may be encrypted; if either of these conditions is met, then the format of the transmission is outside the scope of this symbology specification. Whether or not the reader encrypts the transmitted data, the data shall be identified as resulting from the decode of a Scanlet, rather than from another symbology. Until an AIM Symbology Identifier is assigned, the identification shall be performed in a system-defined manner. If the data is not encrypted, then the encoded data shall be represented as a string of ASCII characters representing the digit-pairs shown in the "Scanlet Value" column of Table 1. The Start and Stop patterns and symbol check character shall not be included in the transmitted data.

Scanlets

Symbol Technologies                                                                 Revision 3.50

Annex A (normative) Check character calculations

A.1 Symbol Check character calculation
The Scanlet symbol check character shall be calculated according to the following rules:
1. Each symbol character is given a value, from the "C128 Value" column of Table 1.
2. Each symbol character position is given a weighting. Beginning on the left, at the first symbol character to the right of the Graphic/ Start pattern, the weights are 1,2,3,4 ... n for all symbol characters up to, but not including, the check character. The number of data digits encoded in the Scanlet is equal to 2n.
3. Each symbol character value is multiplied by its weighting
4. The products of the calculation in step 3 are summed.
5. The sum of the products is divided by 103.
6. The remainder derived from the calculation in step 5 shall be equal to the "Scanlet Value" listed in Table 1 for the decoded symbol check character.

For example, to calculate the symbol check character value for the data "020099":

| | | | |
|---|---|---|---|
| Encoded digits: | 02 | 00 | 99 |
| Character values: | 02 | 00 | 102 |
| Weights: | 1 | 2 | 3 |
| Products: | 2 | 0 | 306 |
| Sum of Products: | 308 | | |
| Divide by 103: | 308 / 103 = 2 | | |
| Remainder: | 102 | | |

In this example, the calculated check character value is 102. According to the "Scanlet Value" column of Table 1, this check character value shall be encoded using the Code 128 symbol character 105.

The symbol check character shall be positioned immediately before the Stop pattern.

A.2 Key-entry check digit calculation
If a human-readable representation of a Scanlet's data content is printed, a Scanlet key-entry check digit shall be printed as the rightmost digit, immediately to the right of the least significant encoded data digit. The key-entry check digit shall be calculated according to the following rules:
1. Consider the leftmost (most significant) digit of the encoded data to be Position 1.
2. Beginning with the leftmost digit (at Position 1), sum the digits at the odd-numbered positions (note that the decimal value of each digit, not the digit's ASCII value, is utilized).
3. Multiply this sum by 3.
4. Beginning with the second digit (at Position 2), sum the digits at the even-numbered positions, and add this sum to the sum calculated in the previous step.
5. Find the smallest number that, when added to the result of the previous step, creates a multiple of 10.
6. Add one to the result of the previous step, and divide by 10; the result is the key-entry check digit.

For example, to calculate the key-entry check digit for the encoded data "0123":

| | | | | |
|---|---|---|---|---|
| Positions: | 1 | 2 | 3 | 4 |
| Encoded digits: | '0' | '1' | '2' | '3' |
| decimal values: | 00 | 01 | 02 | 03 |
| Sum of odd positions: | ( 0 + 2 ) = 2 | | | |
| Sum of odd positions, times 3: | 6 | | | |
| Sum of even positions: | ( 1 + 3 ) = 4 | | | |
| Sum of even and odd digits: | ( 6 + 4 ) = 10 | | | |
| To add up to next multiple of 10: | 0 is the smallest number that, added to 10, adds up to a multiple of 10 | | | |
| Add 1 to previous step, and take mod 10: | 1 is the key-entry check digit. | | | |

If printed, the resulting human readable text string is "01231"

Scanlets

Symbol Technologies ● ● ion 3.50

Annex B (informative) Guidance for the use of Scanlets

B.1 Autodiscrimination compatibility

Scanlets may be read by suitably programmed bar code decoders which have been designed to autodiscriminate it from other symbologies.

The decoder's valid set of symbologies should be limited to those needed by a given application to maximize reading security.

B.2 System considerations

It is important that the various components (printers, paper substrate, and scanners) operate together as a system. A failure in any component, or a mismatch between them, can compromise the performance of the overall system. The characteristics of the printer, symbol, and scanner should be matched to achieve the desired performance.

B.3 Printing considerations

This section describes considerations for printing Scanlets using pixel-based printers, however these same considerations are applicable to all symbologies.

B.3.1 Pixel-based printing

Graphics software used to create bar codes on pixel-based printers must scale each bar and space exactly to the pixel pitch of the printer or digital imaging system being used. For edge to similar edge decodable symbologies like Scanlets, the number of pixels comprising each symbol character must be a fixed and constant integer multiple of the number of modules in the symbol character. For Scanlets, the number of modules is 11 for symbol character values 0 to 105. Therefore, a given printer can only print a certain set of X dimensions.

Compensation for uniform bar width growth (or loss) must be in equal offsetting amounts on all bars and spaces in the symbol. This may be accomplished by changing an integer number of pixels from dark to light or light to dark in the same manner for each bar space pair in the symbol. For example, a vertical column of pixels along the same edge ("leading or trailing) of every bar in the symbol could be changed from dark to light. Alternatively, pixels along both edges of every bar in the symbol could be changed from dark to light, provided that the printer resolution is sufficient to allow this to be performed uniformly. Any set of dark to light or light to dark pixel changes is acceptable provided the adjustment is performed consistently across the whole symbol and does not change the edge to similar edge measurements or the total symbol character width. Failure to follow these principles results in degraded symbol quality and often results in unreadable symbols.

General purpose printing software designed to support a wide range of printers should provide the user the capability of adjusting the X dimension and bar width growth or loss.

Programmer's Example

These principles can be reduced to the following rules for digital bar code design files:
1. Convert the desired X dimension to a module size in pixels, rounded down to the nearest integer (or rounded up, if rounding down would cause the X dimension to fall below the minimum for this application).
2. Determine the number of pixels corresponding to the desired compensation for uniform bar width growth, and round up to the next larger integer (or round down, if rounding up would cause the pixels per dark module to fall below one-half the nominal number of pixels per modules determined above). If compensation for bar width reduction, rather than bar width growth, is needed, perform the equivalent rounding (that is, round up, unless rounding up would cause the pixels per light module to fall below one-half of nominal).
3. Apply the above results to determine the pixel count of every bar and space in the symbol.

EXAMPLE:

Using a printing device that has 24 dots per mm, create a digital bar code design file for a 0.27mm X dimension symbol with 0.06mm of bar width reduction.
- The module size is 24 dots/mm x 0.27 mm/module = 6.5 pixels, which rounds down to 6 pixels per module.
- The desired bar growth compensation is 0.06mm x 24 pixels/mm = 1.4 pixels, which rounds up to 2 pixels.

Scanlets

Symbol Technologies ● ●Revision 3.50

This process results in the following pixel count for bars and spaces as illustrated in Table B.1.

Table B.1 – Correcting pixels for imaging resolution and bar width reduction

| Module Count | Pixel Count | |
|---|---|---|
| | Bars | Spaces |
| 1 | 4 | 8 |
| 2 | 10 | 14 |
| 3 | 16 | 20 |
| 4 | 22 | 26 |

B.3.2 Guidance to users of pixel-based printing software

When printing a symbol for the first time on a printing system consisting of the bar code printing software and the printing device, a user should verify according to ISO/IEC 15416 that the printed symbol meets the required print quality grade and X dimension. If the resulting symbol does not achieve the required symbol quality the user may need to increase the X dimension or change the bar width growth or loss. This process may need to be repeated until the required symbol grade is achieved. Not all printing systems are capable of producing acceptable symbols at small X dimensions.

B.3.3 Process control considerations

For process control purposes, the assessment of average bar width gain or loss, and the application of corrective action to reduce this, are appropriate. The "decodability" parameter measured in accordance with ISO/IEC 15416 is affected both by systematic bar width gain or loss and by variations in edge to similar edge measurements.

Scanlets

What is claimed is:

1. A no-quiet-zone, bar code symbology, comprising: a linear symbol character structure extending between opposite end regions, the structure having a start pattern located only at one of the end regions, a stop pattern located only at the other of the end regions, and a data pattern located between the start and stop patterns, the data pattern comprising a set of numeric characters encoded as different data sequences of bar elements alternating with space elements, the start pattern being a predetermined start sequence of bar elements alternating with space elements, the stop pattern being a predetermined stop sequence of bar elements alternating with space elements, the predetermined start sequence being unique and different from all the data sequences, the predetermined stop sequence being unique and different from all the data sequences, each element having a width measured in unit modules, the predetermined start sequence comprising a start bar element followed by a start space element which is in turn followed by eight additional start bar and space elements, the predetermined stop sequence comprising eight stop bar and space elements followed by a terminating stop bar element, the start space element having a width of three modules.

2. The symbology of claim 1, wherein the start bar element has a width of two modules.

3. The symbology of claim 1, wherein each of the eight additional start bar and space elements of the predetermined start sequence has a width of one module.

4. The symbology of claim 1, wherein the terminating stop bar element has a width of one module.

5. A no-quiet-zone, bar code symbology, comprising: a linear symbol character structure extending between opposite end regions, the structure having a start pattern located only at one of the end regions, a stop pattern located only at the other of the end regions, and a data pattern located between the start and stop patterns, the data pattern comprising a set of numeric characters encoded as different data sequences of bar elements alternating with space elements, the start pattern being a predetermined start sequence of bar elements alternating with space elements, the stop pattern being a predetermined stop sequence of bar elements alternating with space elements, the predetermined start sequence being unique and different from all the data sequences, the predetermined stop sequence being unique and different from all the data sequences, each element having a width measured in unit modules, the predetermined start sequence comprising a start bar element followed by a start space element which is in turn followed by eight additional start bar and space elements, the predetermined stop sequence comprising eight stop bar and space elements followed by a terminating stop bar element, each of seven of the eight stop bar and space elements of the predetermined stop sequence having a width of one module, and the eighth of the stop bar and space elements of the predetermined stop sequence having a width of two modules.

6. The symbology of claim 5, wherein the terminating stop bar element has a width of one module.

* * * * *